United States Patent
Kojo et al.

(10) Patent No.: US 7,154,482 B2
(45) Date of Patent: Dec. 26, 2006

(54) ELECTRONIC EQUIPMENT INCLUDING A TOUCH PAD AND A METHOD FOR CONTROLLING USAGE OF THE TOUCH PAD

(75) Inventors: Akihiro Kojo, Tokyo (JP); Hiroshi Yamazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 810 days.

(21) Appl. No.: 10/342,388

(22) Filed: Jan. 15, 2003

(65) Prior Publication Data

US 2003/0137497 A1    Jul. 24, 2003

(30) Foreign Application Priority Data

Jan. 16, 2002  (JP)  ............... 2002-006841

(51) Int. Cl.
*G09G 5/00* (2006.01)
(52) U.S. Cl. ..................... 345/173; 345/168
(58) Field of Classification Search ........ 345/156–157, 345/161, 167–169, 173; 178/18.01–18.09
See application file for complete search history.

(56) References Cited

U.S. PATENT DOCUMENTS

| | | | | |
|---|---|---|---|---|
| 5,898,425 A | * | 4/1999 | Sekine | 345/168 |
| 6,266,050 B1 | * | 7/2001 | Oh et al. | 345/173 |
| 6,574,095 B1 | * | 6/2003 | Suzuki | 361/680 |
| 6,952,414 B1 | * | 10/2005 | Willig | 370/352 |
| 2002/0082053 A1 | * | 6/2002 | Bae | 455/566 |
| 2002/0093786 A1 | * | 7/2002 | Maser | 361/683 |
| 2003/0107557 A1 | * | 6/2003 | Liebenow et al. | 345/173 |

FOREIGN PATENT DOCUMENTS

| JP | 10-133796 | 5/1998 |
|---|---|---|
| JP | 2001-306246 | 11/2001 |

* cited by examiner

*Primary Examiner*—Ricardo Osorio
(74) *Attorney, Agent, or Firm*—Finnegan, Henderson, Farabow, Garrett & Dunner, L.L.P.

(57) ABSTRACT

Systems and methods are delineated for selectively enabling input from a touch pad in electronic equipment, such as a personal computer, to prevent unintended user input from the touch pad. The electronic equipment may include a keyboard unit and an embedded controller (EC). The keyboard unit may include a special key for generating an interrupt to the EC. An event utility may judge a factor related to the interrupt. If the factor is intended to control the permission or prohibition to use the touch pad, the event utility sends an instruction to the EC for respectively switching the touch pad to an enable state or to a disable state in accordance with the usage permission or prohibition.

8 Claims, 7 Drawing Sheets

ELECTRONIC EQUIPMENT INCLUDING A TOUCH PAD AND A METHOD FOR CONTROLLING USAGE OF THE TOUCH PAD

CROSS-REFERENCE TO RELATED APPLICATIONS

This application claims the benefit of priority from Japanese Patent Application No. 2002-6841, field on Jan. 16, 2002, which is hereby incorporated by reference in its entirety.

TECHNICAL FIELD

The present invention relates to electronic equipment that includes a pointing means and to a method for controlling the pointing means. More particularly, embodiments consistent with the present invention relate to a personal computer including a pointing means, such as a touch pad, and to a method for controlling the input from the pointing means by a special key.

BACKGROUND

Conventionally, electronic equipment, such as a personal computer includes a keyboard unit as an input device. Usually, auxiliary input means, such as a mouse, a track ball, a touch pad, or a stick pointing device, is used together with the keyboard unit in order to move indicators, such as a cursor or an icon displayed on a screen in a display unit, and to perform operations, such as a selection or an execution by clicking or double clicking the pointing device.

In recent years, the touch pad has been widely used as a pointing device for a personal computer due to its operability. The touch pad can easily move a displayed pointer on a screen for a personal computer by moving a finger of a user in a desired direction to move the pointer with touching a surface of the pad.

Usually, a touch pad is positioned in an armrest portion of a main body of a personal computer, i.e., in front of the keyboard unit of the personal computer. Accordingly, it is not uncommon for a user to accidentally contact the touch pad surface during keyboard input operations. By such accidental contact, a cursor may easily move in an unintended direction.

In order to prevent the unintended movement of the cursor from occurring, various techniques have been proposed for prohibiting input operation from a touch pad by using utility software. For example, Japanese Application Publication 10-133796, published May 22, 1998, discloses a technique for allowing input operation from a touch pad only when no keyboard input operation is detected during a predetermined time interval. However, this technique has a problem. Specifically, when no keyboard operation is detected for the predetermined time interval, the pointer may be unintentionally moved due to static electric charge on the user, even though the user has not touched the pad.

Further, Japanese Application Publication 2001-306246, published Nov. 2, 2001, discloses a technique for providing a special button in a portion of the touch pad for selectively enabling the input from a touch pad. However, this technique also has a problem that a user must touch the special button even when a usual pad operation since the button has another function for instructing permission or prohibition of a signal input into the button unit which determines the touch pad operation. This technique has another problem that a careless input operation from the button will be accomplished since the switching of the permission and prohibition are performed by a stroke of the button part.

SUMMARY

The present invention intends to solve the above-mentioned problems. Accordingly, the present invention provides electronic equipment that may prevent an unintended input operation by a touch pad during a keyboard unit input operation. Also electronic equipment consistent with the present invention may recognize the usability of the touch pad. Thus, the present invention provides electronic equipment and a method for controlling a pointing means that can prevent a user from unintentionally inputting with a touch pad.

Consistent with the present invention, there is provided an electronic device, comprising a body including a keyboard and a touch pad; a display coupled to the body; and a controller coupled between the touch pad and an internal bus provided in the body for selectively transmitting input signals from the touch pad to the internal bus, the controller including a first interface and a second interface connected to the internal bus.

Consistent with the present invention, there is also provided electronic equipment comprising a main unit body including a plurality of devices including a keyboard unit for operating the electronic equipment; a display unit body rotatably coupled to the main unit body for providing a screen, the screen displaying a pointer; means for operating the pointer displayed on the screen; means for instructing permission/prohibition of an input operation from the operating means of the pointer; and means for switching between an operation/non-operation state for the operating means in accordance with an instruction of the instructing means.

Also consistent with the present invention, there is provided electronic equipment comprising a main unit body including a plurality of devices including a keyboard unit for operating the electronic equipment, the keyboard unit including a plurality of push-down keys for inputting character sequences; a display unit body rotatably coupled to the main unit body for providing a screen, the screen displaying a pointer; pointing means provided on an upper surface of the main unit body in front of the keyboard unit for operating the pointer displayed on the screen; means for instructing permission or prohibition of an input operation from the pointing means; and means for switching between an operation state and a non-operation state for the pointing means in accordance with an instruction of the instructing means.

Further consistent with the present invention, there is provided electronic equipment comprising a main unit body including a plurality of devices including a keyboard unit for operating the electronic equipment, the keyboard unit including a plurality of push-down keys for inputting character sequences; a display unit body rotatably coupled to the main unit body for providing a screen, the screen displaying a pointer; pointing means for operating the pointer displayed on the screen, the pointer means being located in front of the keyboard unit on an upper surface of the main unit body; a controller coupled between the pointing means and an internal bus provided in the main unit body for transmitting input signals from the pointing means to the internal bus, the controller including a first interface and a second interface connected to the internal bus; means for instructing permission and a prohibition of an input operation from the pointing means; and means for switching between an operation state and a non-operation state for the pointing means in accordance with an instruction of the instructing means; wherein the controller transmits signals input from the pointing means through the first interface to the instructing means and receives a switching instruction from the instructing means through the second interface in order to switch an operation/non-operation state of the pointing means.

Furthermore consistent with the present invention, there is provided a method for controlling operation of a pointer displayed on a screen for electronic equipment comprising a main unit body, a display unit body rotatably coupled to the main unit body for providing the screen, and pointing means provided on an upper surface of the main unit body for operating the pointer displayed on the screen, the method comprising generating an interruption when one of an input permission and an input prohibition is instructed from the pointing means; determining whether the interruption permits input or prohibits input; and setting the pointing means in one of a non-operation state and an operation state in accordance with the instruction from the pointing means.

BRIEF DESCRIPTION OF THE DRAWINGS

The accompanying drawings, which are incorporated in and constitute part of this specification, illustrate various embodiments and/or features related to the invention. Wherever possible, the same reference numbers will be used throughout the drawings for the same or like parts. In the drawings.

DETAILED DESCRIPTION

Figure 1:
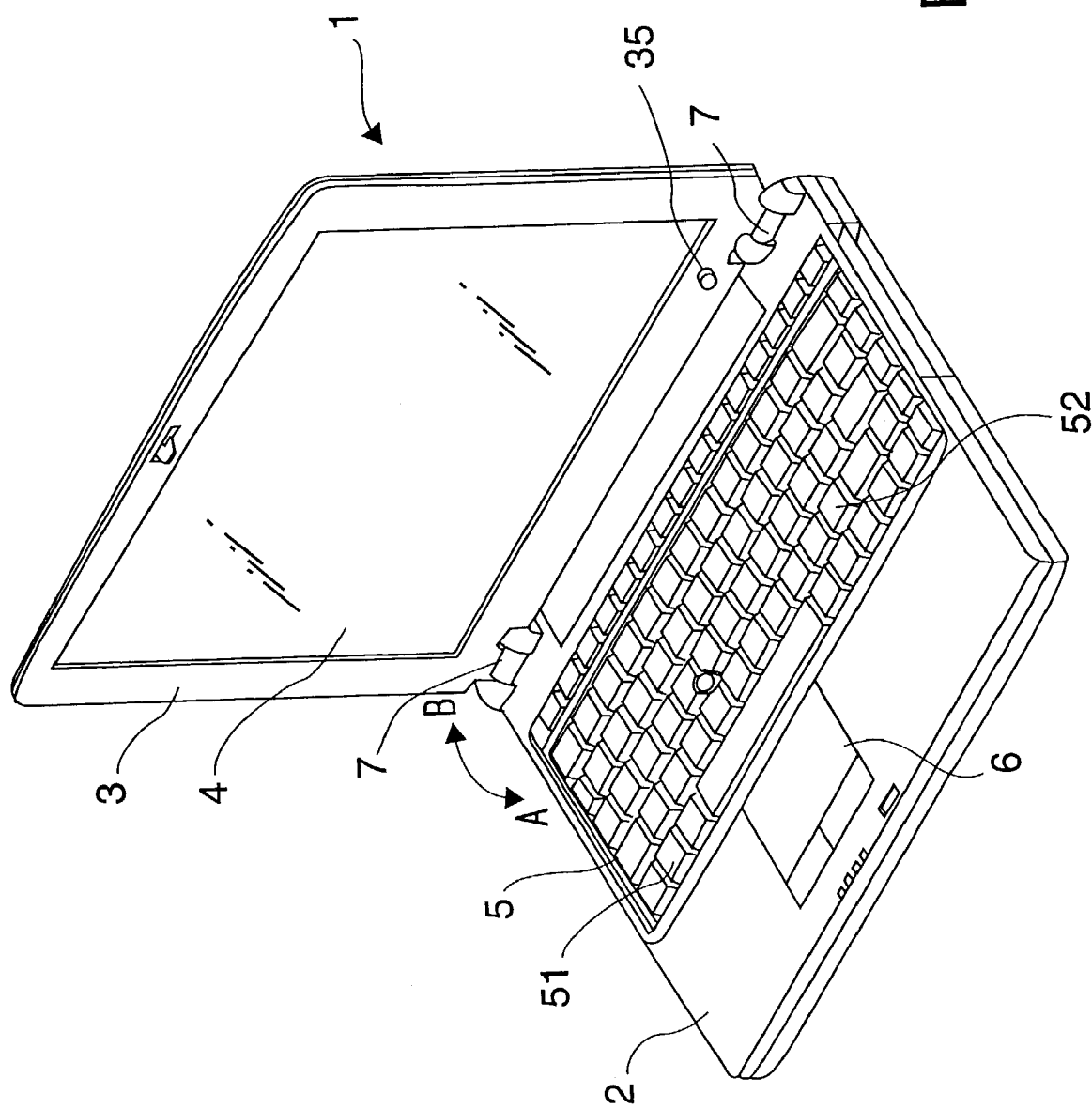
FIG. 1 is a perspective view of a personal computer in which methods and apparatus consistent with the present invention may be implemented.

Reference will now be made in detail to the exemplary embodiments, which are illustrated in the accompanying drawings. Wherever possible, the same reference numbers will be used throughout the drawings to refer to the same or like parts. FIG. 1 illustrates a personal computer 1 that may include a main unit body 2 and a display unit body 3. The display unit body 3 may hold a screen display 4, such as an LCD panel, so that a displaying area is visible. A keyboard unit 5 may be provided on an upper surface of the main unit body 2. An elongated side edge of display unit body 3 may be coupled to a corresponding elongated side edge of main unit body 2 through hinges 7. Thus, display unit body 3 may rotatably move through the hinges 7 along arrow directions A–B to open and close computer 1. Further, a touch pad 6 may be provided as a pointing device in an armrest area, i.e., an area forward of keyboard unit 5 on the upper surface of main unit body 2. When display unit body 3 is closed, it may cover the upper surface of main unit body 2 to protect keyboard unit 5 and touch pad 6.

Figure 2:
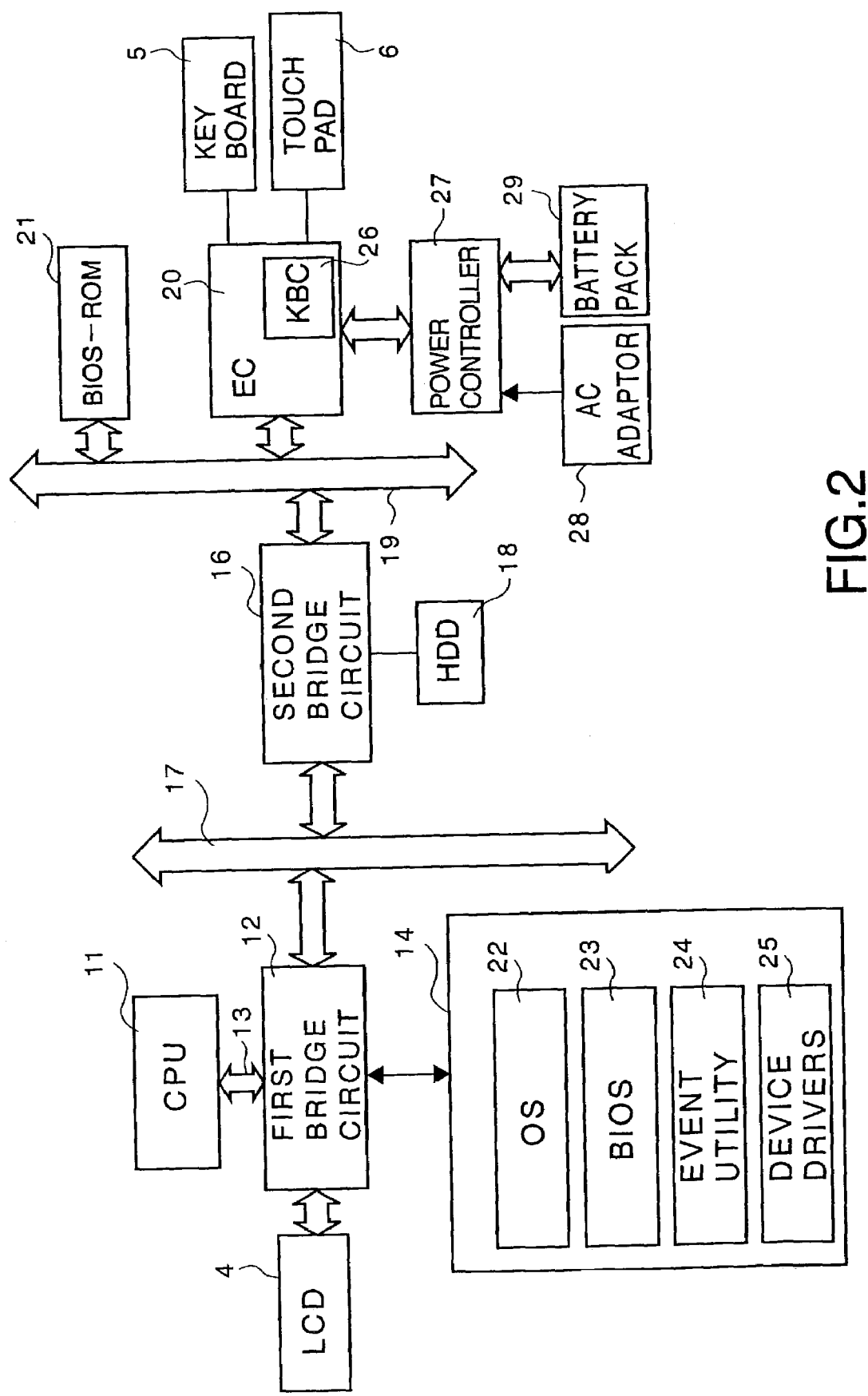
FIG. 2 is a functional block diagram of an exemplary circuit for a personal computer in which methods and apparatus consistent with the present invention may be implemented.

In general, operation of the personal computer is accomplished by electronic components that may be located within main unit body 2. For example, as illustrated in FIG. 2, main unit body 2 of personal computer 1 may include a CPU 11 that may control operational execution and data processing of computer 1; a main memory 14 that may store for example, an operating system (OS) 22, a basic input/output system (BIOS) 23, event utility software 24, various device drivers 25, and processed data; a display controller for the LCD panel 4; a hard disk drive (HDD) 18 as a storing/reproducing apparatus for data; and an embedded controller (EC) 20 that may install a plurality of register groups which may be read from and/or written to by CPU 11. Main memory 14 may include, for example, a plurality of memories, such as dynamic random access memories (DRAM).

OS 22 may control the overall operation of the hardware and the software in personal computer 1. Also, OS 22 may control utility rights, such as an interrupting operation by CPU 11. BIOS 23 may store functional execution routines for accessing various devices in personal computer 1. When personal computer 1 is started, BIOS programs may be read out from a BIOS-ROM 21 through a first 12 and a second 16 bridge circuit. Further, BIOS 23 may store a setup for saving the power supply to control drives for various devices. The event utility software 24 may perform control instructions to BIOS 23 for executing a suitable process, such as an interruption, in accordance with event generation from various devices.

CPU 11 and main memory 14 may be respectively connected to first bridge circuit 12 through a CPU local bus 13. CPU local bus 13 may include a data bus that is 64 bits wide. Usually, first bridge circuit 12 and main memory 14 are coupled using a memory bus, however, CPU local bus 13 may be used as illustrated. Further, a display controller (not shown) may also be connected to first bridge circuit 12 through a data bus. Further, the LCD panel 4 may be coupled to first bridge circuit 12 through the display controller.

In the main unit body 2, first bridge circuit 12 may be coupled to a second bridge circuit 16 through a first bus 17. First bus 17 may include a data bus width of 32 bits. HDD 18 may be connected to second bridge circuit 16. Further, EC 20 and BIOS-ROM 21 may be coupled to second bridge circuit 16 through a second bus 19. Second bus 19 may include a data bus width of 16 bits.

First bridge circuit 12 may be a bridge LSI for coupling between CPU local bus 13 and first bus 17, and it may function as one of the bus master devices for first bus 17. First bridge circuit 12 may perform various functions, such as a function for converting bus width including data and addresses between CPU local bus 13 and first bus 17, and a function for controlling main memory 14 through a memory bus. Further, first bridge circuit 12 may function as a display controller for transmitting display data to LCD panel 4 coupled through first bridge circuit 12. First bus 17 may be a clock synchronization type input/output bus. Thus, whole cycles on first bus 17 may synchronize with a first bus clock. First bus 17 may further include a time-divisionally-used address/data bus.

Second bridge circuit 16 may be a bridge LSI for coupling between first bus 17 and second bus 19 in order to perform bus conversion between first bus 17 and second bus 19. Further, second bridge circuit 16 may install an intelligent drive electronics (IDE) device controller for controlling HDD 18 that may be connected to second bridge circuit 16 for using as a data storage/reproduction device. Second bridge circuit 16 may be coupled to EC 20 and BIOS-ROM 21 through second bus 19.

EC 20 may install a plurality of register groups that may be read from and/or written to by CPU 11. Using these register groups, it is possible to communicate between CPU 11 and EC 20. EC 20 may further function as a keyboard unit controller (KBC) 26. Further, EC 20 may couple to a power controller 27. Power controller 27 may be coupled to an AC adaptor 28 for driving personal computer 1 by supplying a commercial power source. Thus, AC adaptor 28 may be connected to a commercial power source. Further, power controller 27 may control ON/OFF operation of the power source for the personal computer 1. Also, power controller 27 may control a charging operation for a battery pack 29, a secondary power supply. Further, EC 20 may be connected to the input interfaces, such as a keyboard unit 5 and a touch pad 6. Input signals from keyboard unit 5 or touch pad 6 may be converted by KBC 26 for processing by the devices in the computer 1.

BIOS-ROM 21 may store system programs of functional routines for accessing various devices provided in personal computer 1. When personal computer 1 starts up, the BIOS program may be read. Generally, the BIOS program may be stored in a non-volatile memory, such as a flash ROM, in the personal computer 1.

Figure 3:
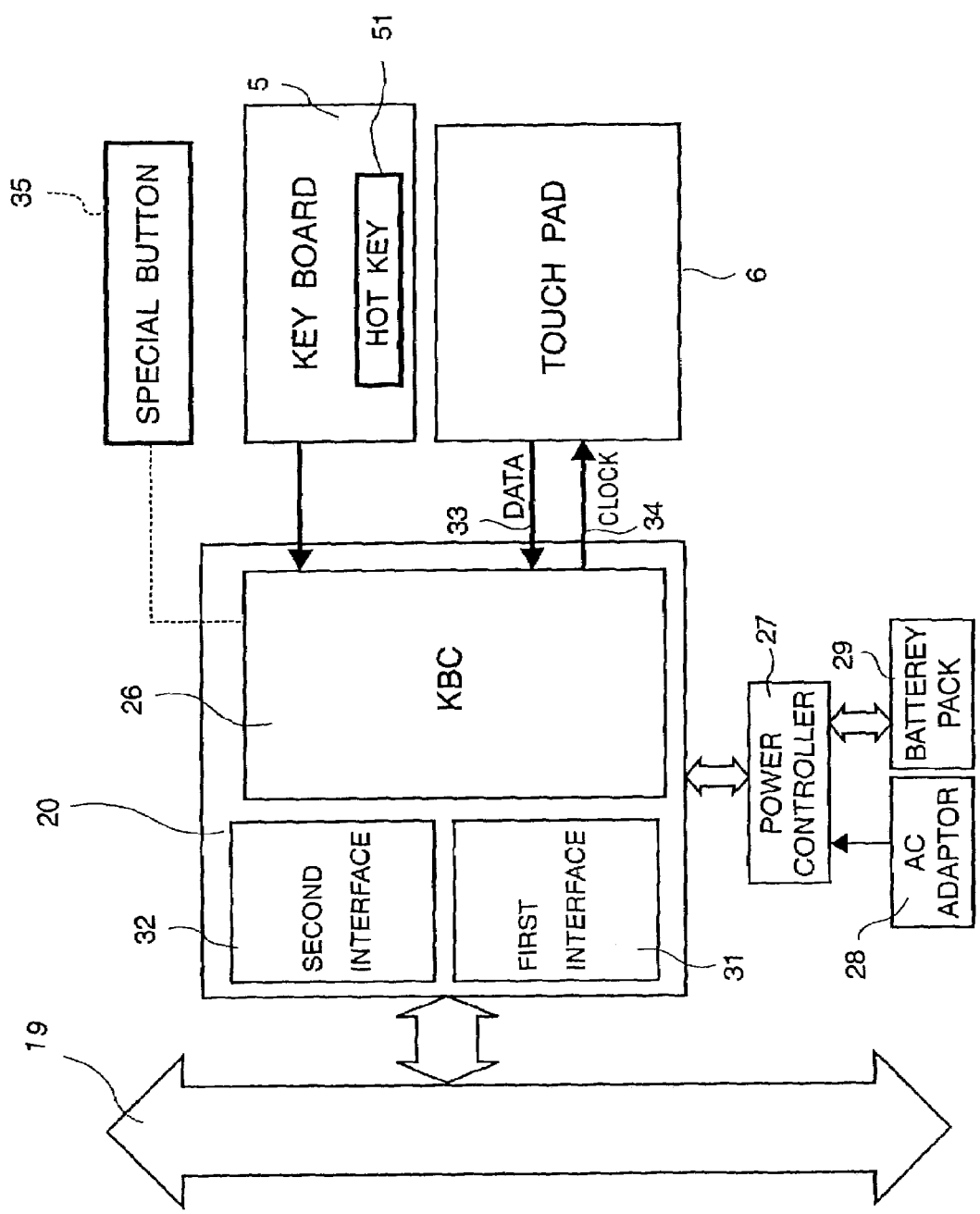
FIG. 3 is a functional block diagram of an exemplary circuit diagram for the EC illustrated in FIG. 2.

Regarding FIG. 3, EC 20 may include a first interface 31 and a second interface 32 that may be respectively coupled to second bus 19. Touch pad 6 may be connected to EC 20 and may be physically connected the Personal System/2 (PS/2) through a data line 33 and a clock line 34. PS/2 is a well-known system available from IBM. First interface 31 may be used by PS/2 drivers that may include a touch pad driver.

According to the disclosed embodiment, second interface 32 may be provided as an exclusive access interface for BIOS 23. Thus, the second interface 32 may be an exclusive interface used for performing the control from BIOS 23. By providing such an exclusive access interface, it is possible to avoid a conflict between BIOS 23 and PS/2 device drivers. Conversely, a conventional personal computer may include only one access interface. Consequently, if a conflict has occurred between BIOS 23 and PS/2 device drivers, a conventional personal computer has to be restarted. Personal computer 1, however, does not need to be restarted when such a conflict between BIOS 23 and PS/2 device drivers occurs, because it is possible to perform a switching operation of a usage permission/prohibition of touch pad 6.

To instruct such a usage of permission/prohibition of touch pad 6, it is also possible, as illustrated in FIG. 3, to provide a special button 35 for instructing to switch the permission/prohibition of touch pad 6. According to the disclosed embodiment, in order to perform the usage control operation of the permission/prohibition for touch pad 6, a user may push a particular key, such as a function (F) key 51 or a question (?) key 52 (hereinafter referred to as a "hot key") that may be provided in keyboard unit 5 or main unit body 2. Further, it is also possible to perform the usage control operation of the permission/prohibition for touch pad 6 by pushing special button 35 that may be provided on display unit body 3.

Figure 4:
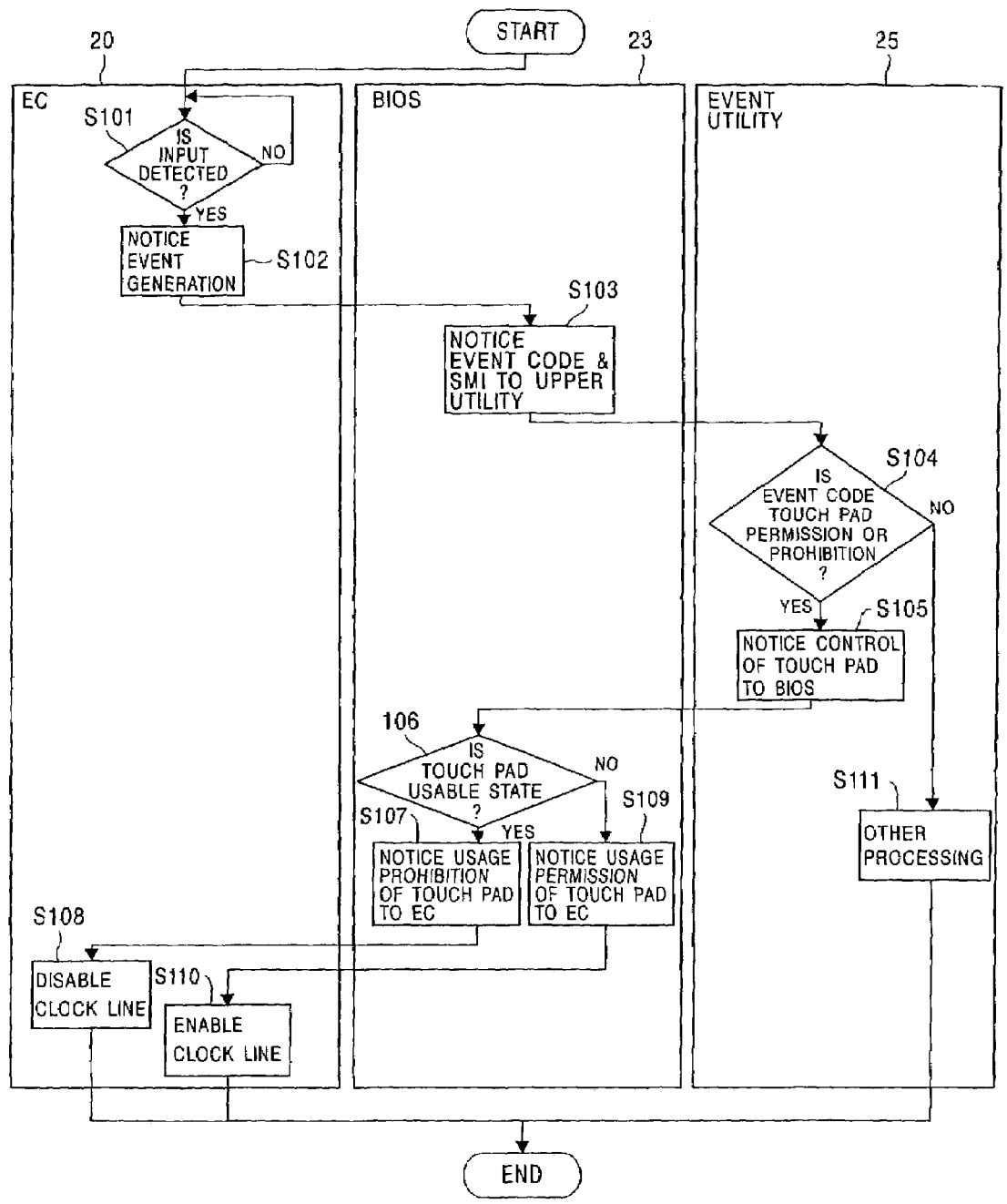
FIG. 4 is a flowchart depicting a method for controlling a touch pad consistent with the present invention.

Regarding FIG. 4, a flowchart depicts a process to control the permission/prohibition to use touch pad 6. When an input from hot key 51 or special button 35 is detected (step S101, YES), EC 20 may generate an interruption signal to inform BIOS 23 of an occurrence of the pushing of such hot key 51 or special button 35 (step S102).

When the interruption from EC 20 is detected, BIOS 23 may notice the event code and the system management interrupt (SMI) operation to an event utility 25 (step S103). Event utility 25 may judge what event has occurred in accordance with the event code received from BIOS 23. If event utility 25 judges that the event code number is intended to notify of the permission/prohibition to use touch pad 6 due to a pushing of hot key 51 or special button 35 (step S104, YES), event utility 25 may send an instruction to BIOS 23 for performing the permission/prohibition control of touch pad 6 (step S105).

When the permission/prohibition control of touch pad 6 is received from event utility 25, BIOS 23 may judge whether touch pad 6 is now under a using state or not. If it is judged that touch pad 6 is presently in a using state (step S106, YES), BIOS 23 may deliver an instruction for prohibiting the usage of touch pad 6 to exclusive-use second interface 32 in EC 20 (step S107). When second interface 32 receives the usage prohibition of touch pad 6, EC 20 may make clock line 34 connected to touch pad 6 disable in order to shift into an input prohibition status (step S108). To make touch pad 6 disable, the signal on clock line 34 may go to a low state. By keeping clock line 34 at the low state, input signal data 33 from touch pad 6 is prohibited from entering KBC 26.

If it is judged that touch pad 6 is in a non-use state (step S106, NO), BIOS 23 may deliver an instruction for permitting the usage of touch pad 6 to exclusive-use second interface 32 in EC 20 (step S109). When second interface 32 receives the usage permission for touch pad 6, EC 20 may make clock line 34 enable in order to shift into an input permission status (step S110). To make touch pad 6 enable, the signal status on clock line 34 may be released from the low state.

If event utility 25 judges that the event code number is not intended to control the permission/prohibition to use touch pad 6 (step S104, NO), event utility 25 may perform other processes in accordance with the event code (step S111). Such other processes may comprise any conventional operations for personal computer 1.

As explained for the disclosed embodiment, selectively enabling or disabling clock line 34 may respectively permit or prohibit input operations from touch pad 6. It is also possible to directly instruct the change of touch pad 6 from BIOS 23. Thus, if usage of touch pad 6 is prohibited, the input signals from touch pad 6 may be destroyed in EC 20 in order to prevent the upper devices from transmitting the data.

Thus, the disclosed embodiment may control the permission/prohibition to use touch pad 6 by pushing hot key 51 or special button 37. It is also possible to control the permission/prohibition to use touch pad 6 by using a graphical user interface (GUI) button displayed on screen panel 4. The GUI button may be displayed by any conventional software. Thus, it is possible to control the permission/prohibition to use touch pad 6 by selecting the displayed GUI button.

Thus, according to the disclosed embodiment, by providing an exclusive-use second interface 32 to interface with touch pad 6 in EC 20, it becomes possible to avoid conflicts among various drivers. Consequently, it becomes possible to switch into status for prohibiting unintended inputs from touch pad 6 without having to restart the computer 1.

Figure 5:
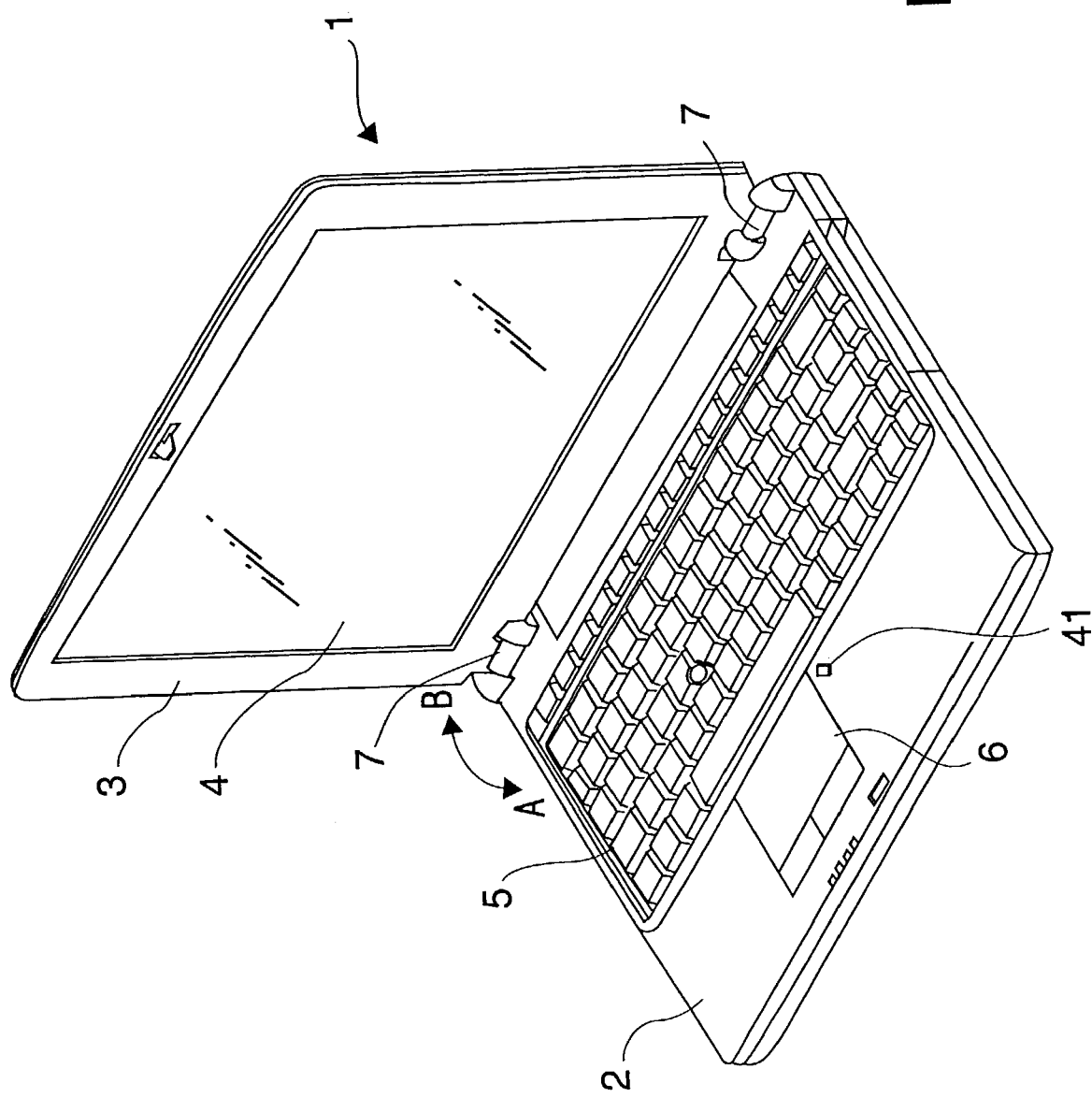
FIG. 5 is a perspective view of a personal computer in which methods and apparatus consistent with the present invention may be implemented.

FIG. 5 illustrates an alternative embodiment. With reference to FIG. 5, a personal computer 1 may include a main unit body 2 and a display unit body 3 that may hold an LCD panel 4. The display unit body 3 may rotatably move through hinges 7 along arrow directions A–B to open and close the computer 1. A keyboard unit 5 may be provided on an upper surface of main unit body 2. Further, a touch pad 6 may be provided as a pointing device in an area forward of keyboard unit 5 on the upper surface of main unit body 2.

A discrimination unit 41, such as a light emitting diode (LED), may be provided to notify a user of a prohibition status for touch pad 6. Discrimination unit 41 may be provided at a position that is easily viewed by the user during operation of touch pad 6. For example, in FIG. 5, LED 41 is located near touch pad 6 on an arm pad area of the upper surface of main unit body 2.

Figure 6:
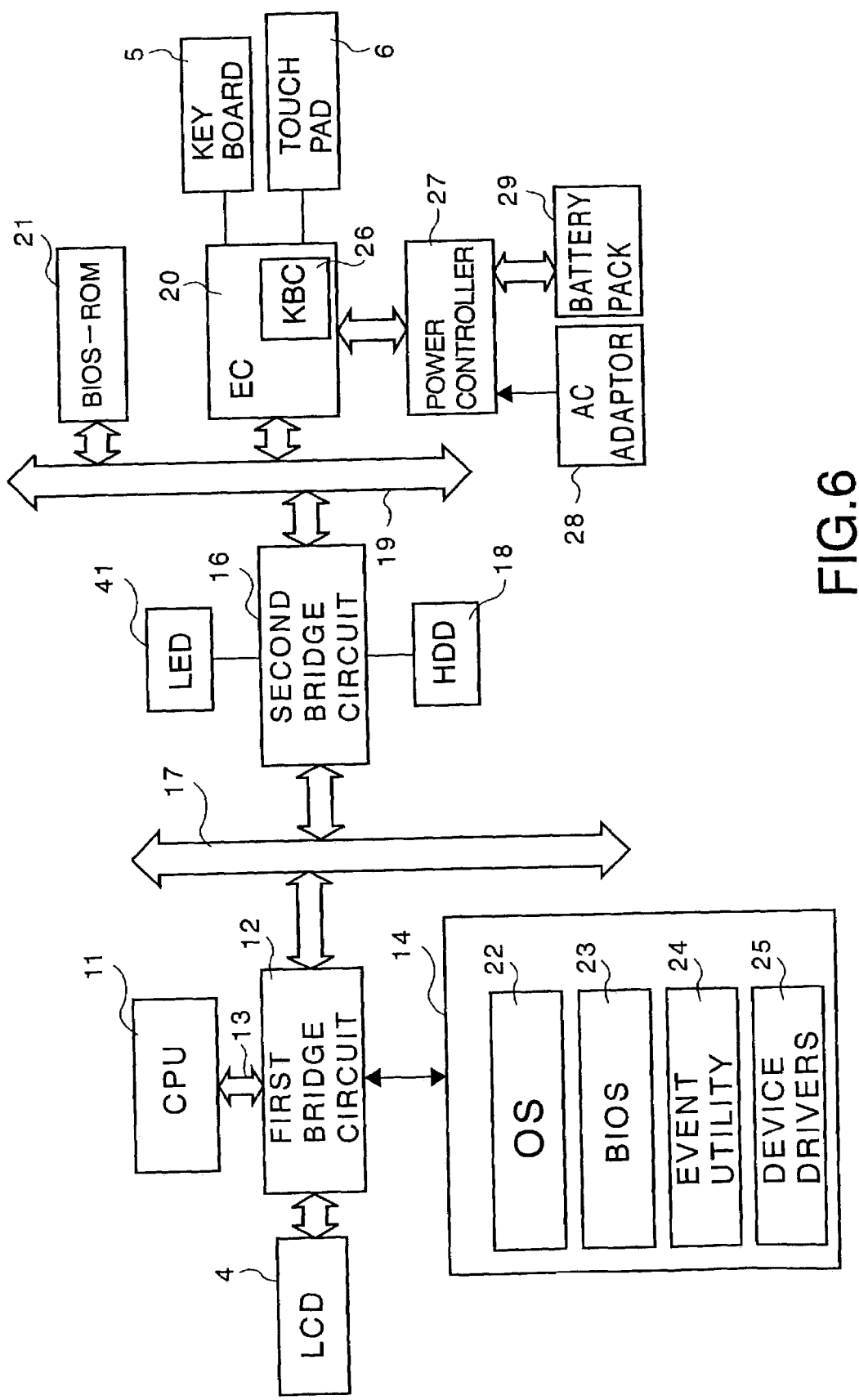
FIG. 6 is a functional block diagram of an exemplary circuit for the personal computer illustrated in FIG. 5 in which methods and apparatus consistent with the present invention may be implemented.

As illustrated in FIG. 6, discrimination unit (LED) 41 may be connected to a second bridge circuit 16. Second bridge circuit 16, coupled between a first bus 17 and a second bus 19, may perform bus conversion between first bus 17 and second bus 19. Second bridge circuit 16 may install an IDE controller for controlling an HDD 18 that may be connected to second bridge circuit 16 as a data storage/reproduction device. Second bridge circuit 16 may be coupled to an EC 20 and a BIOS-ROM 21 through the second bus 19.

EC 20 may function as a keyboard unit controller (KBC) 26. Further, EC 20 may be connected to input interfaces, such as a keyboard unit 5 and a touch pad 6. Input signals from keyboard unit 5 or touch pad 6 may be converted by KBC 26 for processing by other devices in the computer 1.

A CPU 11 and a main memory 14 may be connected to a first bridge circuit 12 through a CPU local bus 13. A display controller (not shown) may also be connected to first bridge circuit 12 through a data bus. LCD panel 4 may be coupled to first bridge circuit 12 through the display controller (not shown). In main unit body 2, first bridge circuit 12 may be coupled to second bridge circuit 16 through a first bus 17. EC 20 and BIOS-ROM 21 may be coupled to second bridge circuit 16 through second bus 19. First bridge circuit 12 may function as one of the bus master devices for first bus 17. First bridge circuit 12 may perform various functions, such as a function for converting bus width including data and addresses between CPU local bus 13 and first bus 17, and a function for controlling main memory 14 through a memory bus. First bridge circuit 12 may also function as a display controller for transmitting display data to LCD panel 4 coupled through first bridge circuit 12. First bus 17 may be a clock synchronization type input/output bus. Thus, whole cycles on first bus 17 may synchronize with a first bus clock.

Figure 7:
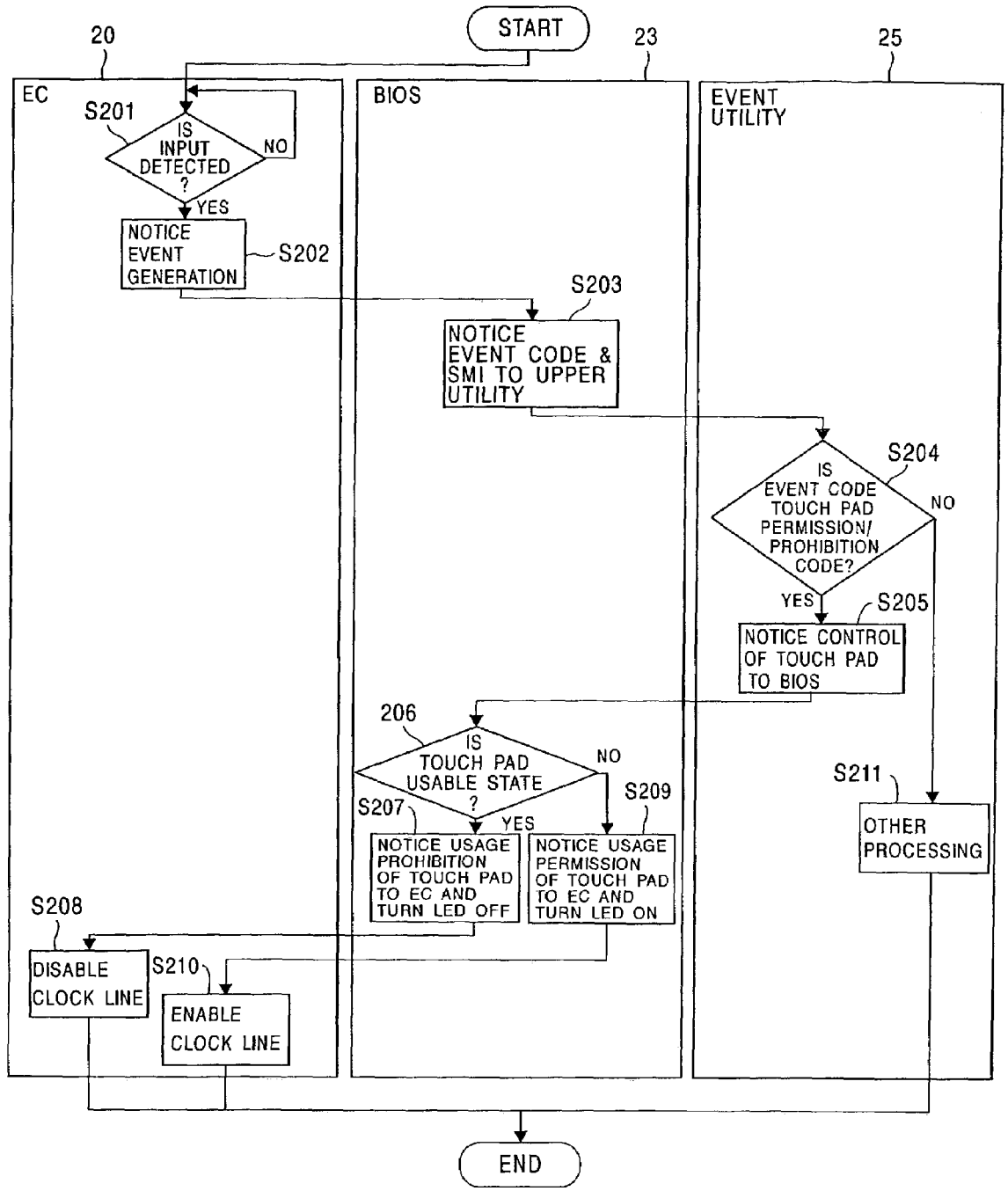
FIG. 7 is a flowchart depicting a method for controlling a touch pad consistent with the present invention.

FIG. 7 depicts a process to control the permission/prohibition to use touch pad 6. As in FIG. 4, when an input from hot key 51, which may be provided in keyboard unit 5, or special button 35, which may be provided on display unit body 3, is detected (step S201, YES), EC 20 may generate an interruption signal in order to inform BIOS 23 of an occurrence of the pushing of such hot key 51 or special button 35 (step S202). When the interruption from EC 20 is detected, BIOS 23 may notice the event code and the SMI operation to an event utility 25 (step S203). Event utility 25 may judge what event has occurred in accordance with the event code received from BIOS 23. If event utility 25 judges that the event code number is intended to control the permission/prohibition to use touch pad 6 due to a pushing of hot key 51 or special button 35 (step S204, YES), event utility 25 sends an instruction to BIOS 23 for performing the permission/prohibition control of touch pad 6 (step S205).

When the instruction to perform the permission/prohibition control of the touch pad 6 is received from event utility 25, BIOS 23 may judge whether touch pad 6 is now under a using state or not. If it is judged that touch pad 6 is in a using state (step S206, YES), BIOS 23 may deliver an instruction for prohibiting the usage of touch pad 6 to exclusive-use second interface 32 in EC 20 and may also deliver an instruction to turn discrimination unit (LED) 41 off (step S207). When second interface 32 in EC 20 receives the usage prohibition of touch pad 6, EC 20 may disable clock line 34 connected to touch pad 6 (step S208). By keeping clock line 34 between KBC 26 and touch pad 6 at a low state, input signal data 33 from touch pad 6 may be prohibited from entry to KBC 26.

If it is judged that touch pad 6 is now in a non-use state (step S206, NO), BIOS 23 may deliver an instruction for permitting the usage of touch pad 6 to exclusive-use second interface 32 in EC 20 and may also deliver an instruction to turn on discrimination unit (LED) 41 (step S209). When second interface 32 receives the usage permission for touch pad 6, EC 20 may enable clock line 34 to shift EC 20 into a status permitting input from touch pad 6 (step S210). To enable touch pad 6, the signal status on the clock line 34 between KBC 26 and touch pad 6 may be released from the low state.

As explained above, a user can recognize the permission/prohibition status of touch pad 6 by viewing LED 41. Thus, it becomes possible for a user to visually judge whether touch pad 6 can be used at any given time.

It is possible to provide discrimination unit 41 other than by providing an LED. For example, it is also possible to construct a portion of touch pad 6 with a semi-translucent material and to provide a luminescence unit of two or more colors underneath the semi-translucent portion of touch pad 6. Thus, the touch pad portion may be lighted up by a predetermined color from under the touch pad surface, and a user can visually recognize the permission/prohibition status of touch pad 6 dependent upon the color of the selected light.

Further, it is possible to store the permission/prohibition information of the touch pad usage into BIOS-ROM 21 in order to succeed the information on touch pad that can be used when the personal computer is re-started.

Thus, according to the disclosed embodiment, it becomes possible for a user to set the input permission/prohibition state for touch pad 6 by switching an input, such as hot key 51. Also it becomes possible to visually recognize the input permission/prohibition state for touch pad 6 by a visual indicator, such as by selectively lighting up a portion of touch pad 6 with a predetermined color.

As explained above, the disclosed electronic equipment and method for switching the input permission/prohibition state of touch pad 6 may reduce confusion for input operations from touch pad 6. Thus, the disclosed embodiments provide electronic equipment with a higher operability of data input and pointing operations.

Other embodiments will be apparent to those skilled in the art from consideration of the specification and practice of the embodiments disclosed herein. It is intended that the specification and examples be considered as exemplary only, with the true scope and sprit of the invention being indicated by the following claims.

What is claimed is:

1. Electronic equipment, comprising:
 a main unit body including a plurality of devices including a keyboard unit for operating the electronic equipment;
 a display unit body rotatably coupled to the main unit body for providing a screen, the screen displaying a pointer;
 means for operating the pointer displayed on the screen;
 means for instructing a permission and a prohibition of an input operation from the operating means of the pointer;

means for switching between an operation state and a non-operation state for the operating means in accordance with an instruction of the instructing means; and means for visually indicating when input from the operating means is permitted.

2. Electronic equipment, comprising:

a main unit body including a plurality of devices including a keyboard unit for operating the electronic equipment, the keyboard unit including a plurality of pushdown keys for inputting character sequences;

a display unit body rotatably coupled to the main unit body for providing a screen, the screen displaying a pointer;

pointing means provided on an upper surface of the main unit body in front of the keyboard unit for operating the pointer displayed on the screen;

means for instructing a permission and a prohibition of an input operation from the pointing means;

means for switching between an operation state and a non-operation state for pointing means in accordance with an instruction of the instructing means; and means for visually indicating when input from the pointing means is permitted.

3. The electronic equipment according to claim 1, wherein the operating means is a touch pad.

4. The electronic equipment according to claim 2, wherein the pointing means is a touch pad.

5. The electronic equipment according to claim 2, wherein the instructing means is a key in the keyboard unit.

6. Electronic equipment, comprising:

a main unit body including a plurality of devices including a keyboard unit for operating the electronic equipment, the keyboard unit including a plurality of pushdown keys for inputting character sequences;

a display unit body rotatably coupled to the main unit body for providing a screen, the screen displaying a pointer;

pointing means for operating the pointer displayed on the screen, the pointer means located in front of the keyboard unit on an upper surface of the main unit body;

a controller coupled between the pointing means and an internal bus provided in the main unit body for transmitting input signals from the pointing means to the internal bus, the controller including a first interface and a second interface connected to the internal bus;

means for instructing a permission and a prohibition of an input operation from the pointing means; and means for switching between an operation state and a non-operation state for the pointing means in accordance with an instruction of the instructing means;

wherein the controller transmits signals input from the pointing means through the first interface to the instructing means and receives a switching instruction from the instructing means through the second interface in order to switch between the operation state and the non-operation state for the pointing means.

7. A method for controlling operation of a pointer displayed on a screen for electronic equipment comprising a main unit body, a display unit body rotatably coupled to the main unit body for providing the screen, and pointing means provided on an upper surface of the main unit body for operating the pointer displayed on the screen, the method comprising:

generating an interruption when one of an input permission and an input prohibition is instructed from the pointing means;

determining whether the interruption permits input;

setting the pointing means in one of a non-operation state and an operation state in accordance with the instruction from the pointing means; and indicating when input from the pointing means is permitted.

8. An electronic device, comprising:

a body including a keyboard and a touch pad;

a display coupled to the body;

a controller coupled between the touch pad and an internal bus provided in the body for selectively transmitting input signals from the touch pad to the internal bus, the controller including a first interface and a second interface connected to the internal bus; and means for visually indicating when input from the operating means is permitted.

* * * * *